C. J. CUTLER.
BRAKE.
APPLICATION FILED JUNE 20, 1916.
1,239,358.
Patented Sept. 4, 1917.
2 SHEETS—SHEET 2.
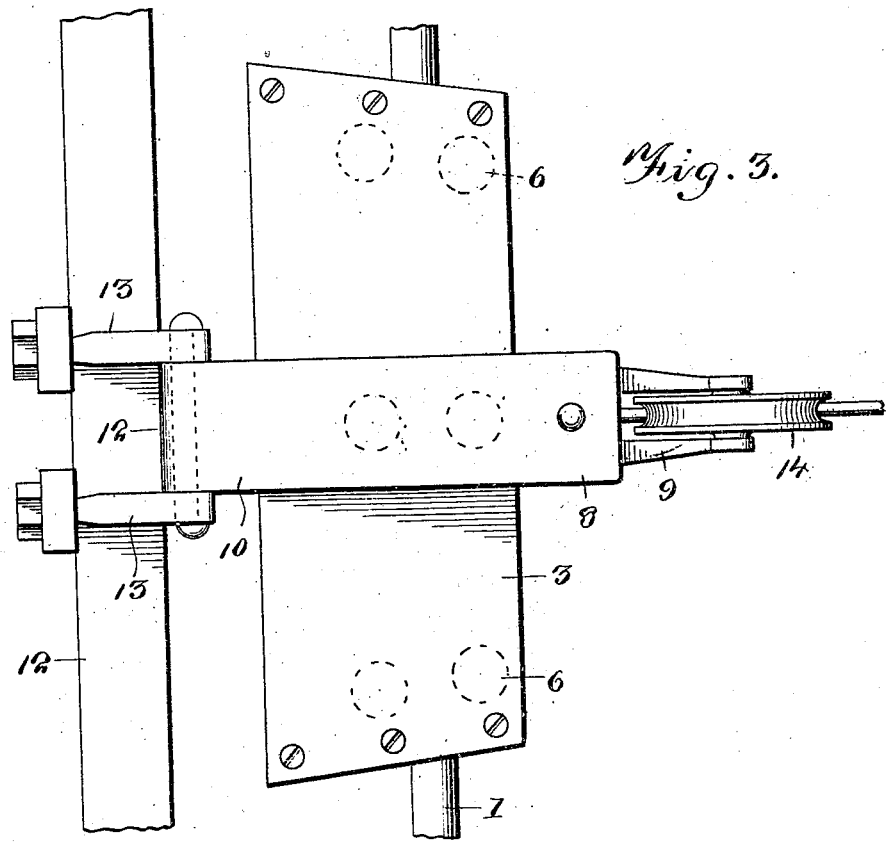
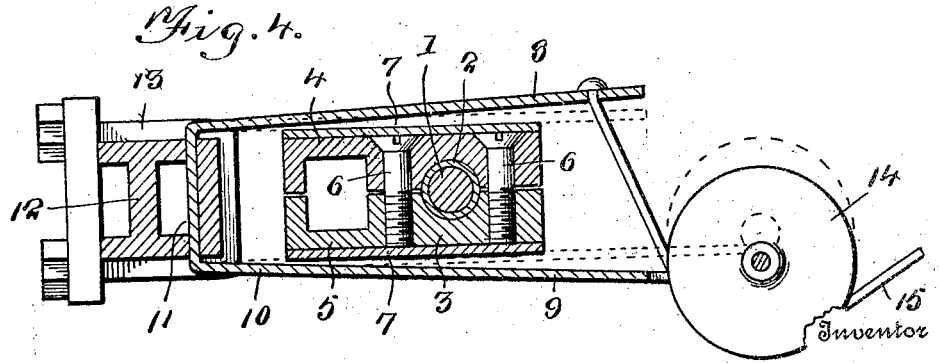
Witnesses
E. R. Rulffitt.
Wm. R. Smith
Inventor
C. J. Cutler
By Victor J. Evans
Attorney

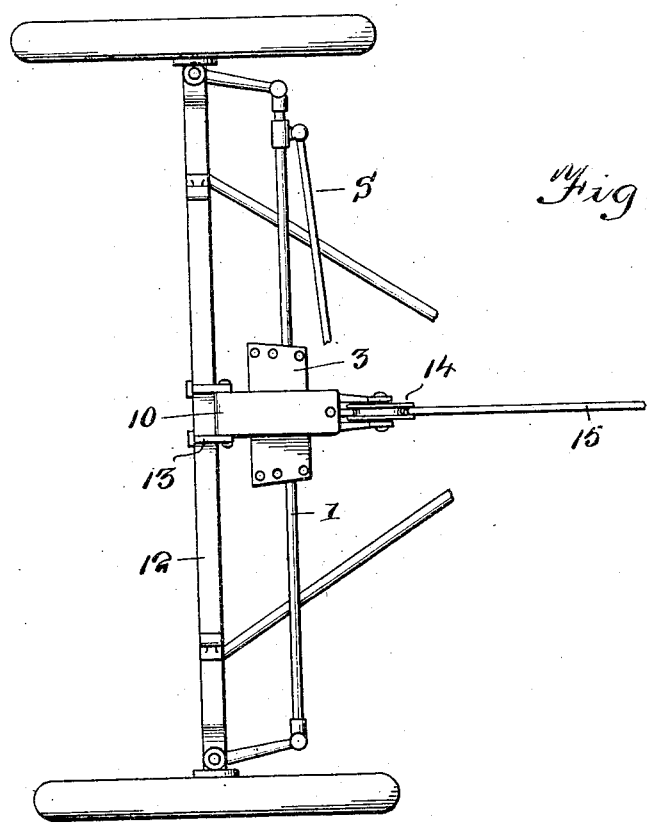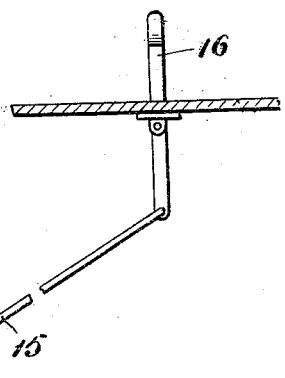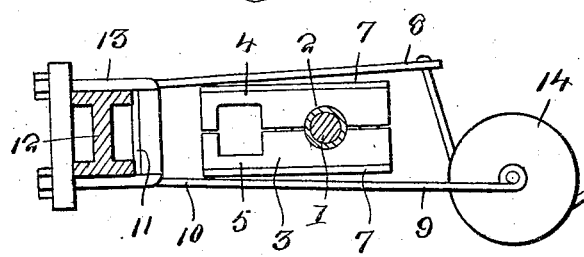

UNITED STATES PATENT OFFICE.

CHARLES J. CUTLER, OF BUTTE, MONTANA.

BRAKE.

1,239,358.   Specification of Letters Patent.   Patented Sept. 4, 1917.

Application filed June 20, 1916. Serial No. 104,759.

*To all whom it may concern:*

Be it known that I, CHARLES J. CUTLER, a citizen of the United States, residing at Butte, in the county of Silverbow and State of Montana, have invented new and useful Improvements in Brakes, of which the following is a specification.

This invention relates to a brake so constructed as to retard a reciprocating element and has for its primary object to construct a device of this character capable of acting against the steering rod of an automobile and holding the same against movement.

An object of the invention is to accomplish the foregoing result manually so that the device will not interfere with the movement of the rod when the steering wheel is being operated.

Besides the above my invention is distinguished in the use of a slidable block receiving reciprocatory motion upon movement of the steering rod in combination with a manually operated means adapted to be thrown into frictional engagement with the block.

With these and other objects in view the invention will be better understood from the following detailed description taken in connection with the accompanying drawings, wherein—

Figure 1 is a view illustrating my invention applied to an automobile.

Fig. 2 is a longitudinal sectional view of a portion of the automobile showing my invention in side elevation.

Fig. 3 is an enlarged top plan view of the invention.

Fig. 4 is an enlarged sectional longitudinal view thereof.

Referring to the drawings the numeral 1 designates the steering rod of the steering mechanism S of the automobile and frictionally mounted upon this rod by means of the bushing 2 is the block 3 composed of an upper part 4 and a lower part 5. The parts tightly engage the bushing 2 through the action of bolts 6 carried by the upper part and screw threaded into the lower part. Each part carries a shoe 7 of any suitable material and these shoes 7 are arranged to be acted upon by the limbs 8 and 9 of the U shaped spring 10 the center portion 11 of which is secured to the front axle 12 of the automobile by the clip 13.

The means for manually moving the limbs 8 and 9 into frictional engagement with the shoes consist of a pulley 14 rotatably mounted upon the free end of the limb 9 and a flexible element such as a cable 15 having one end secured to the free extremity of the limb 8 and passing around the pulley 14 with its remaining end secured to a foot pedal 16 arranged in convenient reach of the operator of the vehicle.

The most important feature of my invention is that when the front wheels of an automobile tend to wabble due to heavy driving through sand or mud, pressure can be applied to the foot pedal 16 for moving the limbs of the spring into frictional engagement with the block which immediately retards movement of the steering rod. When the position of the wheels is to be changed the operator relieves the pedal 16 of pressure and the steering wheel of the automobile is operated in the usual manner.

From the foregoing description taken in connection with the accompanying drawings it should be apparent that I provide a device which is admirably adapted for the purpose for which it is intended and which is simple, durable and efficient, and may be manufactured and sold at a comparatively low cost.

What I claim is:

1. In combination with the steering rod of a motor vehicle, a brake block arranged to frictionally engage said rod, a substantially U-shaped resilient member having its central portion secured in fixed relation to a part of the vehicle, and means for forcing the limbs of said resilient member against said brake block, said means including a manually operable cable connected to said limbs.

2. In combination with the steering rod of an automobile, a block frictionally associated with said rod, a substantially U-shaped spring having its central portion secured to a portion of the automobile, and means for forcing the limbs of said spring into frictional engagement with said block, said means including a manually operated cable connected to the limbs.

3. In combination with the steering rod of an automobile, a block frictionally associated with said rod, a substantially U-shaped spring having its central portion secured to a portion of the automobile, a pulley supported by one of the limbs of said spring, and a manually operated cable having a connection with the other limb and passing around said pulley.

In testimony whereof I affix my signature.

CHARLES J. CUTLER.

Copies of this patent may be obtained for five cents each, by addressing the "Commissioner of Patents, Washington, D. C."